Figure 1:
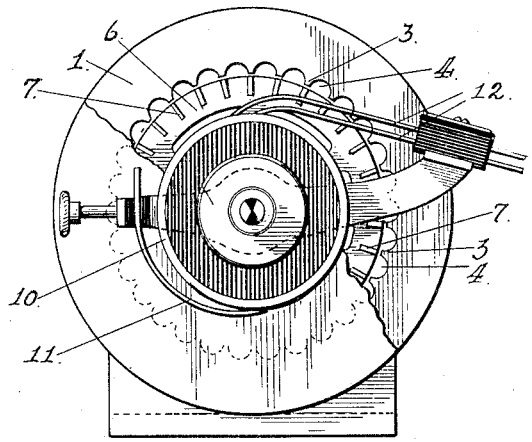

J. J. MONTGOMERY.
RECTIFYING ELECTRIC CURRENTS.
APPLICATION FILED AUG. 28, 1909.

974,171.

Patented Nov. 1, 1910.

2 SHEETS—SHEET 1.

Witnesses:
Arthur L. Sloe
S. Constine

Inventor:
John J. Montgomery
by Wm. F. Booth
his Attorney

J. J. MONTGOMERY.
RECTIFYING ELECTRIC CURRENTS.
APPLICATION FILED AUG. 28, 1909.

974,171.

Patented Nov. 1, 1910.
2 SHEETS—SHEET 2.

UNITED STATES PATENT OFFICE.

JOHN J. MONTGOMERY, OF SANTA CLARA, CALIFORNIA.

RECTIFYING ELECTRIC CURRENTS.

974,171.   Specification of Letters Patent.   Patented Nov. 1, 1910.

Application filed August 28, 1909. Serial No. 515,107.

*To all whom it may concern:*

Be it known that I, JOHN J. MONTGOMERY, a citizen of the United States, residing at Santa Clara, in the county of Santa Clara and State of California, have invented certain new and useful Improvements in Rectifying Electric Currents, of which the following is a specification.

My invention relates to the art of rectifying alternating electric currents, and it has for its object the more perfect rectification of such currents by means of commutators.

Attempts have heretofore been made in the electrical arts to rectify alternating electric current by the rotation of a commutator through rigid connection to the shaft of a so-called synchronous electric motor, but it has never been possible to accomplish this directly without injurious sparking, owing to the impossibility of obtaining, with the means employed, perfect synchronism between the motion of the motor and the current waves brought to the commutator to be rectified.

My process consists in passing the current which is to be rectified through a pole changing device, one element of which proceeds with a step-by-step movement imparted to it by a moving element having a progressive movement which coincides with the fluctuations in the duration of the successive electrical waves of such alternating current. When my process is employed the motion of the moving element is undulatory in its character, and each undulation is in exact synchronism or time relationship with the electric wave by which it is produced. Each successive wave is instantaneously responded to by the moving element, which, together with the element of the pole changing device attached to it makes a corresponding advance. It makes no difference whether the waves are or are not equal among themselves in time duration or intensity. In either event each undulation in the motion commences at the exact instant of time when the corresponding electrical wave by which it is induced originates, and ends at the exact instant when the electrical wave ceases. The result is that one of the commutating elements proceeds in exact step with the waves which produce its movement and when the brushes are properly set the commutation is sparkless and perfect.

In one form I have embodied my process in an electric motor and commutator combination illustrated in the drawings accompanying my application, in which the same numerals found in the respective figures refer to the same parts, and in which drawing—

Figure 2:
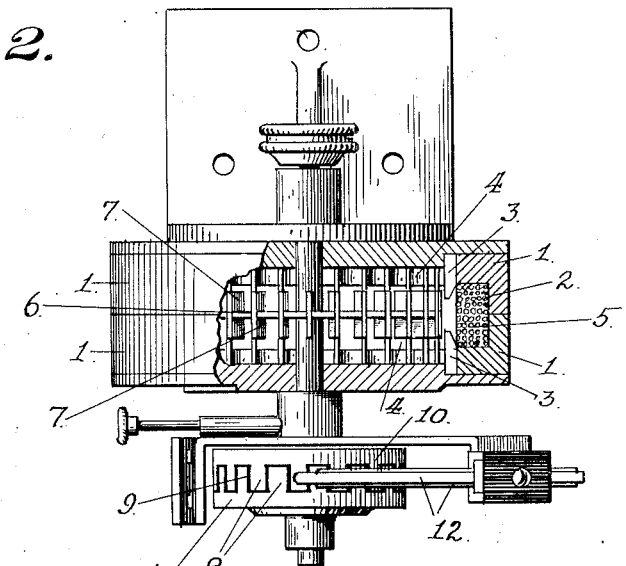
Figure 3:
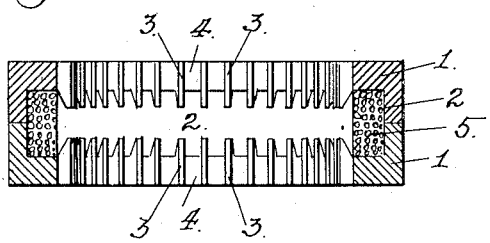
Figure 4:
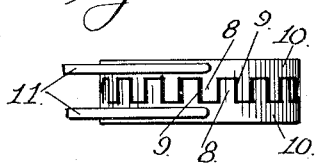
Figure 5:
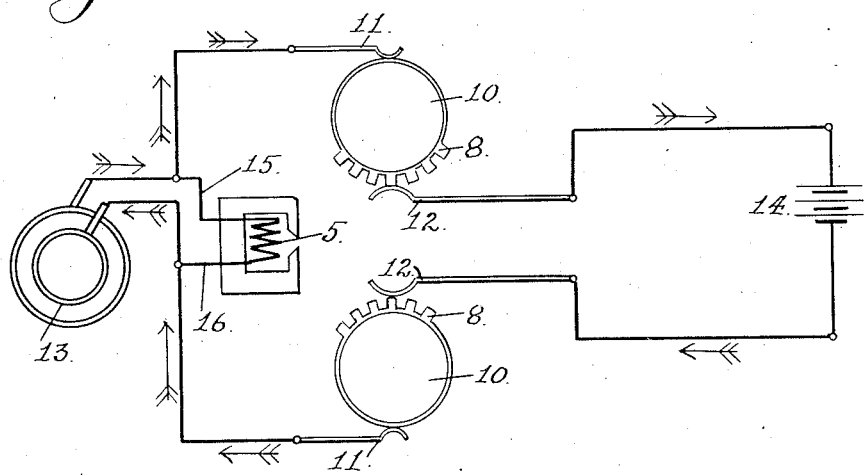

Figure 1 is an end elevation of the motor with a portion of the inclosing end shield broken away. Fig. 2 is a plan view of the combined motor and commutator with the motor shown in partial section, exposing the rotating element, 6. Fig. 3 is a section of the stationary element of the motor with the end shields removed. Fig. 4 is a plan view of the commutator and Fig. 5 is a diagrammatic representation of the circuit connections.

The field magnet of the motor is made of soft iron or steel and for convenience is made in the form of two iron rings, 1, 1, of such section that when put together as shown they form an annular groove within which is placed the field coil, 5, wound from insulated wire, the winding being continuous, and the two terminals being brought out so that they may be connected across a circuit supplying electrical waves. The inner projecting portions of the iron rings are cut through at equi-distant intervals, leaving inwardly projecting pole tips, 3, 3, of equal dimensions, with spaces, 4, 4, between them. The pole tips on the two rings when assembled are directly opposite each other.

When electrical current is passed through the coil, 5, the iron of the rings is magnetized and each projecting tip becomes a magnetic pole, all those on one ring being of one polarity, and those on the other ring of the opposite polarity. The rotatable element, 6, is carried on a shaft to which it is secured, and mounted in bearings of any convenient form, so as to be concentric with the circles of the pole tips. The rotatable element, 6, consists of a light wheel having soft iron or steel bars or projections, 7, secured to the wheel or forming an integral part thereof, having a width about the same as the pole tips of the stationary element, and being equal in number thereto, and having equal angular spacing therewith. The field coil of the motor is supplied with alternating current by means of a shunt derived from the current supplying the current to be rectified.

The rotor being mounted as described, if the terminals of the field coil, 5, are connected across the two sides of a circuit supplying waves of electrical current, the rotatable element will move to a position where its projecting bars, 7, will be directly facing the pole tips, 3, of the stationary element, and will be held in this position by the magnetic attraction between them. It should be noted that the coil exerts a direct magnetizing action on the bars, 7, and that they are also magnetized by induction from the pole tips, 3, and that the two actions are additive. Now, if the motor be given an angular motion by an extraneous force in either direction, and the electrical, magnetic, frictional, and mechanical elements have been properly coördinated, the motion will be continued in the direction given by the extraneous force, due to the action of the successive electrical waves passed through the field coil, and the rotor will revolve and carry the commutator forward in exact step or synchronism with the electrical waves, the motion being an undulatory one, the angular advance of each undulation being the same and each advance being co-terminous in time with the electric wave producing it. It will be noted that one or more sets of pole tips, 3, 3, may be used with the full set of bars or projections, 7, as shown, or one or more bars or projections may be used with the full set of pole tips as shown.

The commutator which I combine with a motor of the operative principle above described is secured to the shaft of the motor and in the specific machine which I am now describing as representing one form in which my process may be embodied, is composed of two sets of live segments, 8, of equal widths, and spaced equally around the circumference, with dead segments, 9, of insulating material placed between them. There are as many live segments, 8, as poles, 3, in the field magnet. Each alternate segment is connected with rings, 10, forming a common field for all the segments of each set, and the contact brushes, 11, convey the alternating electric current which is to be rectified to the respective rings.

The commutator brushes, 12, are separately and collectively adjustable. Their thickness circumferentially must be less than the width of the insulation between the live segments. The commutator brushes, 12, must be adjusted so that their contact with the live segments of the commutator will be broken by the rotation produced by the motor at the instants of time when the waves of alternating current are at zero potential. This adjustment can be made by shifting the position of the brushes until the sparking between the commutator segments and the brushes disappears.

In Fig. 5, the electric circuit of the device embodying the process is shown.

If the uni-directional current is to be used with a translating device which requires a definite polarity at its terminals, a polarized relay may be inserted in shunt across the leads from the commutator, which will operate a pole changing switch, so as to always deliver current in the same direction to the translating device, no matter in which direction the current may flow from the commutator.

It is noted that the number of live segments of the commutator need not have the same number of live segments as the field magnet has poles, but that the number of segments must correspond with the number of steps of motion imparted to the commutator in one revolution. The commutator may be of various designs so long as it conforms to this requirement. It is noted that more than one commutator may be used at the same time on the motor shaft, this being a mere matter of duplication.

The motor above described is but one expression of many types or designs of motors which might be constructed and used in my process but it is essential to my process that the motor used must embrace the same operative principle as the motor above described and its parts must be so coördinated that the moving element is made to advance in exact step with the electric waves, pursuant to that principle.

Among possible mechanical combinations embodying or expressing the principle of my process the following may be mentioned: 1. A mechanism in which the revolving element is made to revolve outside of the stationary element instead of on the inside, while the commutator is attached to the revolving element, and so made to keep step with it. 2. A mechanism in which the commutator does not rotate, but the brushes are affixed to the moving element and are thus rotated around the commutator and dragged across the respective segments in exact step with the waves of the current. It will be noted moreover, that the current to be rectified may be fed into the machine through the indicated commutator brushes instead of through the indicated contact brushes and may be drawn off through the indicated contact brushes instead of through the indicated commutator brushes. Again, one set of commutator segments and one brush may be eliminated, and the circuit correspondingly modified, and thus every second wave may be picked up with the remaining segments and brush, thereby affording a uni-directional pulsating current. So also two such sets of segments may be used on the same shaft and the second so arranged as to take the waves omitted by the first, and thus two separate unidirectional pulsating currents may be delivered.

In order that any person skilled in the art or science of electricity may be able to construct, compound, and use a machine embodying my rectifying process I give the following method which I have myself used and by means of which I have been able to compound, construct, and use this combination: First as regards the motor: I assume a diameter for the rotor such that its circumference can carry the number of pole pieces requisite to make its speed or revolution moderate as compared to the usual speeds of small-sized electric motors, according to the well-known rule for alternating current generators and motors, that the number of revolutions multiplied by the number of pairs of poles must equal the frequency of the current produced or used. The width of the pole tips should be less than half the distance between adjacent poles, and in practice I have used a width equal to two-ninths of the distance from center to center of adjacent poles. In the sizes of motors which I have constructed, I have used 30 poles, and operated them on currents having a frequency of 7200 alternations per minute. Such a motor must, therefore, run at 240 revolutions per minute. I have made the width of the pole faces about 3/32 of an inch.

In order that the magnetic forces may respond to variation in the current flowing in the field coil, I make the iron rings of such section that the magnetic circuit shall be as short as possible and still leave space for the energizing coil. To the same end the air gap or clearance of the motor is made as small as is consistent with mechanical clearance. All parts of the magnetic circuit are made of such ample cross section that the iron is worked at a low degree of saturation. The coil is made with a number of turns and with wire of such a size that the magnetizing action is intended at first to be so great as to cause the motion of the rotor to be irregular or intermittent, and then by inserting temporary resistance in its circuits, the current flowing is varied until the action is smooth and regular, when the amount of current flowing is measured. A permanent resistance can then be inserted to take the place of the trial resistance, or the coil may be replaced by one which will give the same number of ampere-turns as the trial coil, with the resistance in series with it. The mass of the rotating element is made small. In practice I first make it of such weight as to require additions to get uniform motion, which additions can then be made a little at a time until a satisfactory result is obtained. In starting to build a motor for operating against a certain load, the following elements of the problem are fixed: The frequency and voltage of the current on which it is to operate, and the load it is to carry. I then arbitrarily establish the cross section of the iron rings, having in mind the limitations outlined above, and then play on the variations that can be produced in the magnetizing force, and the mass of the moving element, until a proper coördination is obtained, under which the operation will be regular. That such coördination is essential to producing regular action is shown by the fact that if any one of the factors is varied in any marked degree after the coördination, the motor will either not operate at all, or its motion will be erratic. For instance if the magnetizing is increased the motion becomes erratic, and the rotor may even rotate in one direction and then in the other, and at times vibrating back and forth without rotation.

The problem of deriving a mathematical solution for expressing the relations between the different factors is not an impossible one, but so many indeterminate physical constants appertaining to the materials used in any given case are involved, and the process is such a complex one that I have found the empirical method outlined above to be the preferable one to follow.

The essentials of the commutator have already been sufficiently indicated herein as have also the general requirements regarding the commutator brushes. Any other suitable pole changing device may also be used provided it is susceptible of operation by the step-by-step motion above described imparted by the moving element.

The unidirectional current produced by my process and device is susceptible of use in connection with all classes of translating devices to which such current has been applied, and I hereby anticipate and disclose any combination and device of my process with any such other device or process at present known. Among the various uses and processes to which it may be applied I enumerate the following, but by so doing do not exclude others not specifically named: Charging storage batteries of any kind and for any service; operating electric lights of all kinds; the operation of any and all classes of motors and moving devices capable of being operated by current of the kind produced; the carrying out of electrolytic, electro-chemical, electro-thermal, electroplating, and electro-therapeutic processes. I also hereby anticipate and disclose the use of my process and device in combination with any and all devices at present known for opening and closing circuits; for operating protective or safety devices; for operating electrical or electro-mechanical signal devices; devices for preventing the overcharging of storage batteries; and, generally, I hereby anticipate and disclose any combination of my device with any electrically operated device or devices for which the current supplied by my process and device is adapted.

I point out and claim as my invention or discovery, the following:

1. In the art of reorganizing alternating electric current the herein described process of rectification which consists in the following operations: (1) In imparting to the moving element through the agency of a fixed element and the utilization of a derived portion of the current under rectification, a succession of positive and negative accelerations, the resultant effect of which is a step-by-step progression of the moving element undulatory in its character, the successive undulations being in response to the successive variations of the electrical forces of the current under rectification, and in synchronism with and coterminous as regards time with, such variations, whether such variations occur in successively equal times or not; and (2) in imparting the said step-by-step progression to an element of a pole changing device having its other elements connected to the circuit carrying the current under rectification, and which said element receiving said step-by-step motion coöperates with the other elements of the pole changing device to successively reverse the order of the terminal connections of the circuit carrying the current under rectification to a utilization circuit, substantially as described.

2. The herein described process of rectifying an alternating current which consists in giving to the moving element through the agency of a fixed element a succession of positive and negative accelerations, the resultant effect of which is a step-by-step progression of the moving element in exact consonance with the variations of the current to be rectified and in imparting the step-by-step movement to an element of a pole changing device adapted to coöperate with other elements of a pole changing device so as to successively reverse terminal connections, substantially as described.

3. The herein described process of rectifying an alternating current which consists in giving to a moving element through the agency of a fixed element, a succession of positive and negative accelerations, the resultant effect of which determines a step-by-step progression of the moving element in exact consonance with the variations of the current to be rectified, and in imparting the step-by-step movement so determined, to an element of a pole changing device adapted to coöperate with other elements connected to the circuit carrying the current under rectification, to successively reverse the order of the terminal connection of the circuit carrying the current under rectification to a utilization circuit, by the step-by-step movement imparted to the element of a pole changing device substantially as described.

4. The herein described electric motor and commutator combination for reorganizing electric currents, which consists of a motor comprising a field magnet of soft iron or steel having an annular groove formed therein, a coil in said groove, the inner projections of the sides of the groove being cut through at equi-distant intervals, leaving one or more sets of inwardly projecting pole tips, the pole tips being opposite each other, those on one side of the groove, when energized, being of the same polarity, and those of the opposite side being of the opposite polarity; and a rotatable element carried on a shaft so mounted as to be concentric with the circles of the pole tips, and consisting of a wheel having soft iron or steel projections completing the magnetic circuit between the pole tips; in combination with a commutator and brushes capable of being so adjusted that their contact with the live segments of the commutator shall be broken by the rotation produced by the motor at the respective times when the waves of alternating current are at zero potential, all substantially as described.

In testimony whereof I have signed my name to this specification in the presence of two subscribing witnesses.

JOHN J. MONTGOMERY.

Witnesses:
WM. F. BOOTH,
D. B. RICHARDS.